United States Patent [19]

Streicher

[11] 4,039,133

[45] Aug. 2, 1977

[54] CORNER STRUCTURE FOR A LOAD SUPPORTING FRAME

[76] Inventor: Henry P. Streicher, 2347 Underhill Road, Toledo, Ohio 43615

[21] Appl. No.: 606,515

[22] Filed: Aug. 21, 1975

Related U.S. Application Data

[63] Continuation-in-part of Ser. No. 471,852, May 21, 1974, abandoned.

[51] Int. Cl.² ............................................. F16M 11/20
[52] U.S. Cl. ............................. 248/188.8; 108/153; 211/182; 403/176; 403/219
[58] Field of Search ............ 108/111, 153, 155, 156; 248/188, 188.1, 188.8; 211/182; 52/263, 753 D, 753 G, 758 C, 758 H; 403/170, 171, 176, 218, 219; 5/292

[56] References Cited

U.S. PATENT DOCUMENTS

| 1,694,656 | 12/1928 | Huetten | 403/218 |
|---|---|---|---|
| 2,552,286 | 5/1951 | Kompass | 248/188 |
| 2,657,964 | 11/1953 | Watrons | 108/157 |
| 2,871,489 | 2/1959 | Emmert | 108/156 X |
| 2,905,514 | 9/1959 | Friend | 403/247 |
| 3,129,965 | 4/1964 | Stark | 211/182 X |
| 3,195,196 | 7/1965 | Carisi | 403/219 |
| 3,642,310 | 2/1972 | Hudson | 403/219 |

FOREIGN PATENT DOCUMENTS

| 757,856 | 1/1934 | France | 248/188 |
|---|---|---|---|
| 77,478 | 1/1962 | France | 248/188 |
| 730,839 | 8/1932 | France | 108/153 |
| 1,111,366 | 7/1961 | Germany | 403/219 |
| 2,220,738 | 8/1973 | Germany | 403/171 |
| 395,469 | 12/1965 | Switzerland | 403/219 |

Primary Examiner—Roy D. Frazier
Assistant Examiner—William E. Lyddane
Attorney, Agent, or Firm—William J. Clemens

[57] ABSTRACT

A corner structure for a load supporting frame having a pair of horizontal side members with mitered end portions attached in end abutting relationship. The end portions are inserted in slots longitudinally extending from the upper end of an upright tubular leg. A pair of planar wedge members having a cooperating longitudinal slot and tab respectively are connected to define a predetermined angular relationship corresponding to the angle subtended by the side member end portions. In an alternate embodiment, a single, relatively wide slot longitudinally extends from the upper end of the upright tubular leg and a planar wedge member and an angle wedge member are connected to define the predetermined angular relationship. The attached wedge members are inserted between the side member end portions and the inner wall of the tubular leg to retain each end portion in the slot.

4 Claims, 9 Drawing Figures

CORNER STRUCTURE FOR A LOAD SUPPORTING FRAME

CROSS-REFERENCE TO RELATED APPLICATION

This application is a continuation-in-part of application Ser. No. 471,852, which was filed May 21, 1974, entitled "Corner Structure For A Load Supporting Frame", now abandoned.

BACKGROUND OF THE INVENTION

1. FIELD OF THE INVENTION

This invention relates generally to load supporting frames and in particular to a corner structure therefore.

2. DESCRIPTION OF THE PRIOR ART

In furniture of the type having a metal supporting frame, it has been common to attach the legs to the horizontal frame members by welding or with threaded fastening means. If the load to be supported was relatively heavy, the welded joints or the fasteners were required to be of substantial size in order to achieve a frame of sufficient strength and rigidity. However, where the load to be supported was a transparent table top, the welded joints or threaded fasteners detracted from the over-all appearance of the completed table. Furthermore, where frame was provided with a decorative surface finish, such as mirror polishing, anodizing, painting or chrome plating, the welded joints or threaded fasteners became even more noticeable and objectionable.

Previous attempts at solving this problem have taken the form of concealing the joint inside the table leg. U.S. Pat. No. 1,630,492 issued to Kusterle shows a furniture frame having a welded corner construction which is enclosed by a mounting piece attached to the top of a leg. U.S. Pat. No. 3,195,196 issued to Carisi discloses a two-piece clamp with threaded fastener enclosed in a tubular leg. However, these joints still require either welding or the threading in of a fastener after the joint has been concealed to provide the necessary rigidity for the frame.

U.S. Pat. No. 2,905,514 discloses a table having braces which interconnect the legs. A pair of braces are inserted in openings formed in the leg. The ends of the braces are mitered and are brought into abutting relationship inside the leg. The outwardly facing surfaces of the braces at the mitered ends seat against a seating member inserted in the leg. The inwardly facing surfaces of the braces at the mitered ends have a curvalinear seat for receiving a dowel which is trapped against the inside surfaces of the leg.

SUMMARY OF THE INVENTION

The present invention is employed in a load supporting frame, typically a frame for a table having a transparent glass top. The horizontal side members of the frame have mitered ends which are attached together at a predetermined angle to form the corners of the frame structure. Each corner is provided with an upright tubular leg having a pair of slots longitudinally extending from the upper end thereof into which the abutting ends of the side members are inserted. A pair of planar wedge members having a cooperating longitudinal slot and tab respectively are attached together to form two of the same predetermined angles as the side members and their complementary angles. The attached wedge members are inserted between the inside wall of the tubular leg and the mitered end portions to retain the frame members in the slots thereby creating a rigid and strong frame which is attractive and eliminates the above-described problems found in the prior art.

In an alternate embodiment of the present invention, the upright tubular leg has a single, relatively wide slot longitudinally extending from the upper end thereof into which the abutting ends of the side members are inserted. A planar wedge member and an angular wedge member are connected together to form an angle the same as the predetermined angle and its supplementary angle. The connected wedge members are inserted between the inside wall of the tubular leg and the mitered end portions to retain the frame members in the slots thereby creating a rigid and strong frame.

It is an object of the present invention to provide a load supporting frame which is strong, economic to manufacture and attractive in appearance.

It is another object of the present invention to provide a load supporting frame which conceals from view the joints between its horizontal side members.

It is a further object of the present invention to provide a load supporting frame which does not require a welded or threaded fastener connection between the legs and the horizontal side members.

DESCRIPTION OF THE PREFERRED EMBODIMENT

Figure 1:
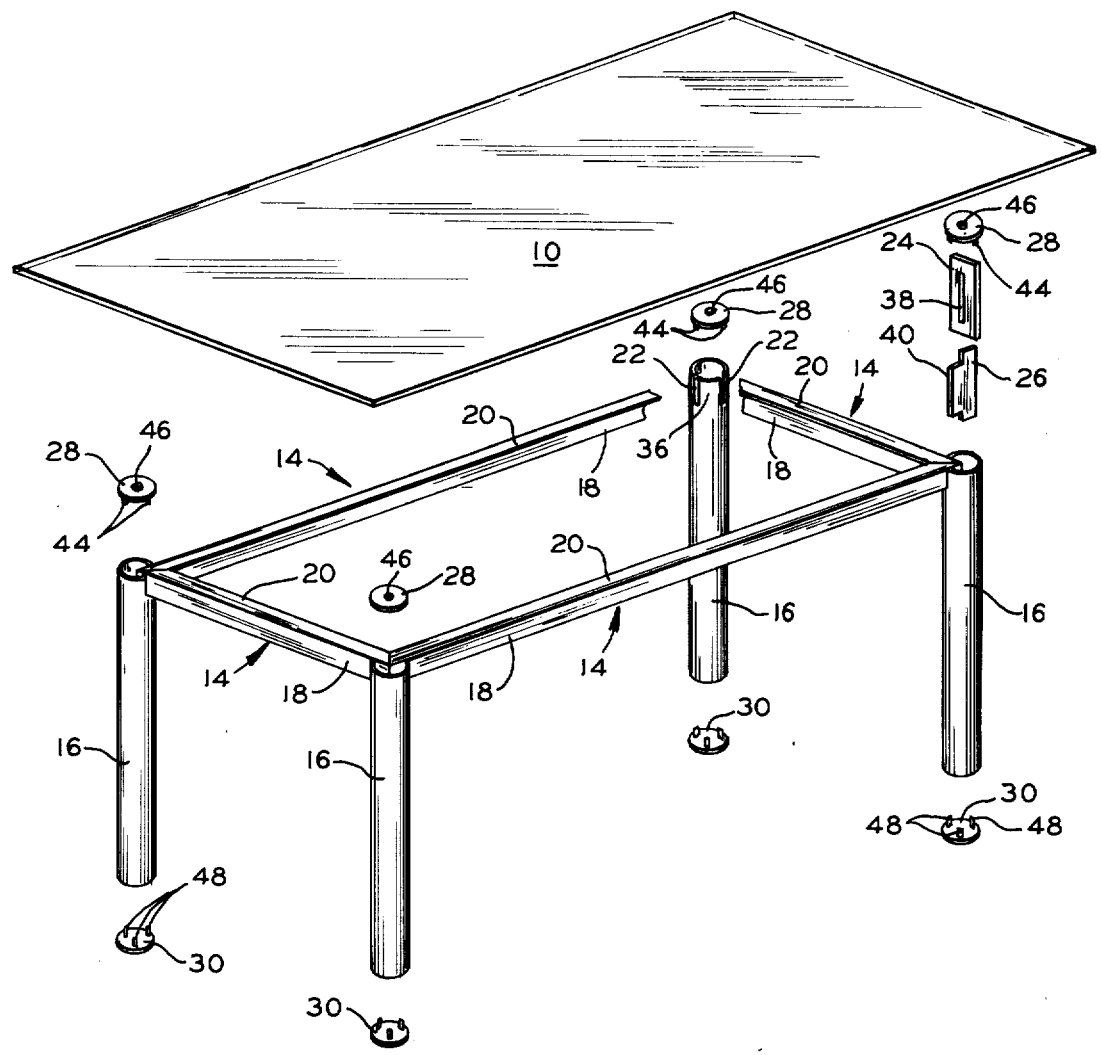
FIG. 1 is an exploded perspective view of a generally rectangular table employing the present invention.
Figure 2:
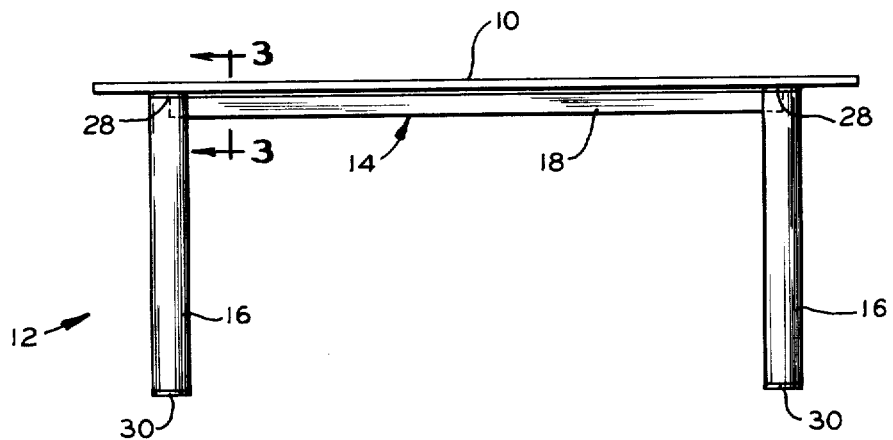
FIG. 2 is a side elevational view of the table of FIG. 1.

Referring to FIGS. 1 and 2, there is shown a generally rectangular table having a heavy transparent glass top 10 supported by a frame 12. The frame 12 is comprised of four horizontal side members 14 interconnected with four upright legs 16. The horizontal side members are of angle section having a vertical front flange 18 and an upper horizontal flange 20. Each side member 14 is terminated by mitered ends which abut the mitered ends of the adjacent side members to form right angle relationships. Each leg 16 is tubular and has a pair of substantially parallel slots 22 extending longitudinally from the upper end thereof. At each corner of the frame, the vertical front flange portions at the abutted ends of the side members 14 are inserted into a pair of slots 22 where they are retained by a pair of planar wedge members 24 and 26 as described hereinafter. The legs 16 are terminated at the upper and lower ends thereof by a top cap 28 and a bottom cap 30 respectively.

Figure 3:
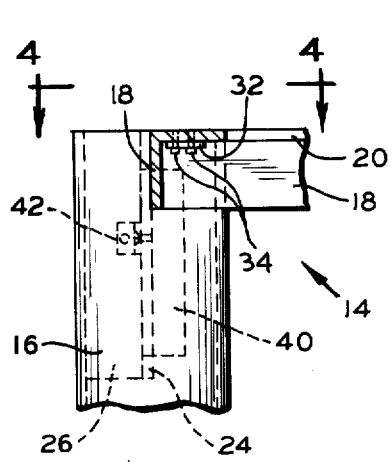
FIG. 3 is a fragmentary vertical sectional view taken along the line 3—3 of FIG. 2.
Figure 4:
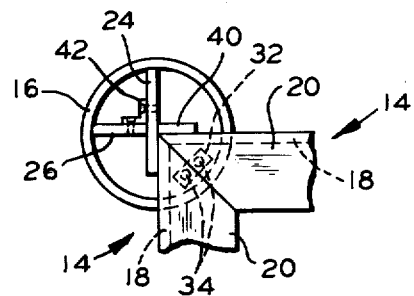
FIG. 4 is a fragmentary plan view taken along the line 4—4 of FIG. 3.
Figure 5:
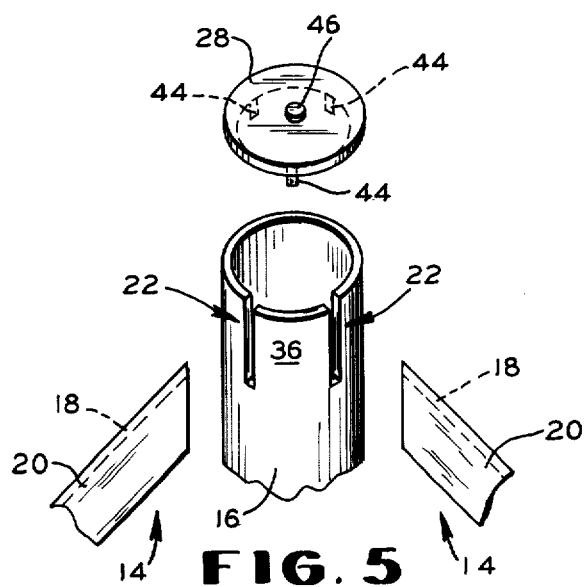
FIG. 5 is a fragmentary perspective view of the corner structure of the table of FIG. 1.

Referring to FIGS. 3, 4 and 5, there is shown the present invention as employed in the corner structure of the above-described table. The mitered ends of the horizontal side members 14 are attached, typically by a connector plate 32, to form a right angle. The connector plate 32 may be fastened to the side members 14 by any suitable means 34, such as a countersunk screw or a flush head rivet, which does not extend above the upper surface of the upper horizontal flanges 20. The slots 22 intersect the wall of the leg 16 at right angles to one another to define an arc on the outer surface of the leg 16 designated as a leg wall portion 36. The length of the slots 22 as measured from the upper end of the leg 16 is equal to the distance from the lower edge of the vertical front flange 18 to the upper surface of the upper horizontal flange 20. The upper edge of the wall portion 36 is recessed below the upper end of the leg 16 by a distance equal to the thickness of the upper horizontal flanges 20. Therefore, when the vertical front flanges 18 are inserted into the slots 22, the lower edges of the flanges 18 and the lower surfaces of the flanges 20 are designed to contact the bottom of the slots 22 and the upper edge of the wall portion 36 respectively.

The horizontal side members 18 are retained in the slots 22 by the wedge members 24 and 26. Referring to FIGS. 1, 3 and 4, there is shown the wedge member 24 having a longitudinal slot 38 which cooperates with a longitudinal tab 40 of the wedge member 26. The wedge members 24 and 26 are maintained in right angular relationship by a right angle bracket 42 which may be attached to the wedge members by a conventional fastening means such as screws or rivets. The tab 40 and an adjacent planar portion of the wedge member 24 contact the outer surfaces of the flanges 18 while the opposite edges of the wedge members 24 and 26 engage the inner wall of the leg 16 to secure the side members 14 in the slots 22.

Referring to FIGS. 1 and 5, there is shown the top cap 28 having substantially parallel upper and lower surfaces. Extending from the lower surface of top cap 28 are three retaining pins or spring fingers 44. The diameter of top cap 28 is equal to the outside diameter of the leg 16 so that a portion of the lower surface of the top cap rests upon the upper end of the leg 16 and the upper surface of the flanges 20. The retaining pins 44 engage the inside surface of the leg 16 to frictionally retain the top cap 28 on the upper end of the leg. The bottom caps 30 are similar to the top caps 28 and have three retaining pins or spring fingers 48 for frictionally retaining the bottom caps on the lower ends of the legs 16. Each of the top caps 28 also has a button 46 attached to the upper surface thereof upon which glass top 10 may rest. The button is made from a material which is softer than glass, typically nylon, which will not scratch the lower surface of the glass top.

In summary, the present invention permits the construction of a load supporting frame with a minimum of members and concealed corner joints which also is attractive in appearance. The mitered end portions of horizontal side members are inserted into longitudinally extending slots formed in the upper ends of upright tubular legs. A pair of planar wedge members having a cooperating longitudinal slot and tab respectively are inserted into the tubular leg to engage the inner wall thereof and the end portions of the horizontal side members to form a rigid load supporting frame. The side members and legs may be surface finished by chrome plating for example, to provide a decorative appearance.

Figure 6:
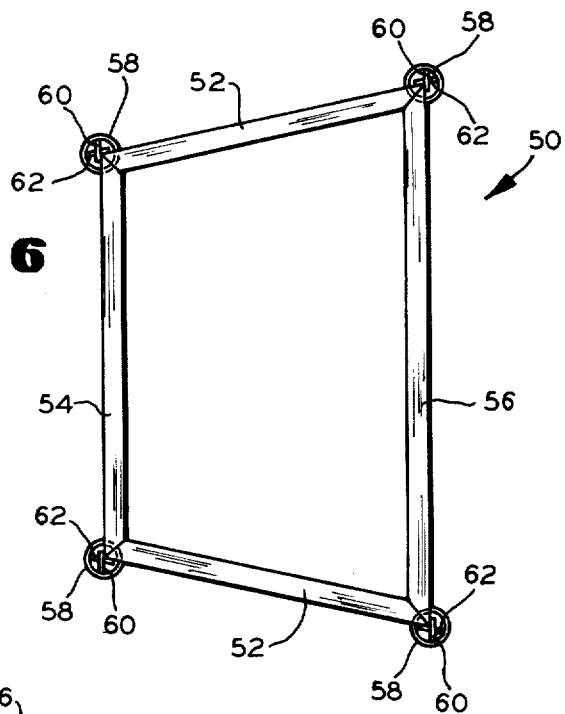
FIG. 6 is a plan view of a frame employing the present invention to retain frame members at two predetermined angles.

Although in its preferred embodiment the present invention is shown as employed in a generally rectangular table, it will be appreciated that the number of legs and the number and the lengths of the side members utilized may be varied to determine the angles to be formed by the wedge members 24 and 26, the slots 22 and the mitered ends of the side members 14 without departing from the spirit and scope of the invention. Referring to FIG. 6, there is shown in plan view a frame 50 comprising a pair of side members 52, a side member 54 and a side member 56 interconnected with four upright legs 58. The side members 52 are approximately equal in length and the side member 54 is shorter then and parallel to the side member 56 to form a trapezoid. The side members are retained in the slots (not shown) in the upright legs 58 by pairs of planar wedge members comprising a wedge member 60 having a longitudinal slot and a wedge member 62 having a longitudinal tab.

The side members 52 and 54 form a first pair of predetermined angles with one another and the side members 52 and 56 form a second pair of predetermined angles with one another wherein the first and second predetermined angles are supplementary. The wedge members 60 and 62 are maintained in either the first or the second predetermined angular relationship by a bracket (not shown) similar to the bracket 42 orf FIGS. 3 and 4. The tab of the wedge member 62 and an adjacent edge portion of the wedge member 60 contact the outer surfaces of the side members while the opposite edges of the wedge members 60 and 62 engage the inner wall of the leg 58 to secure the side members in the slots.

Figure 7:
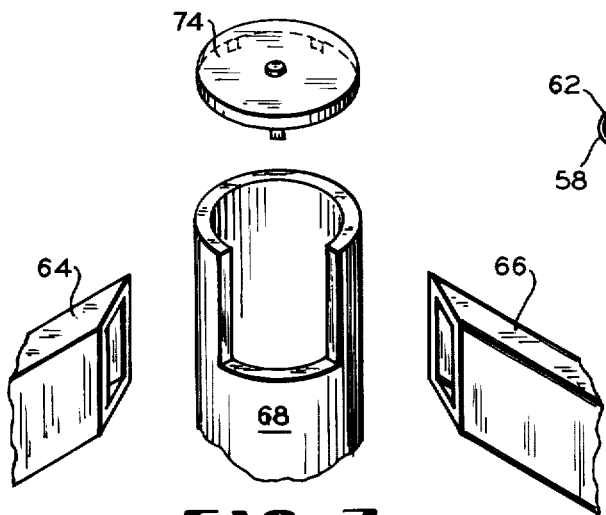
FIG. 7 is a fragmentary perspective view of an alternate embodiment of the corner structure according to the present invention.
Figure 9:
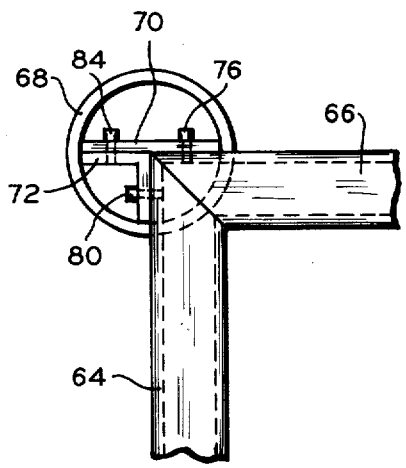
FIG. 9 is a fragmentary elevational view of the corner structure of FIG. 8.
Figure 8:
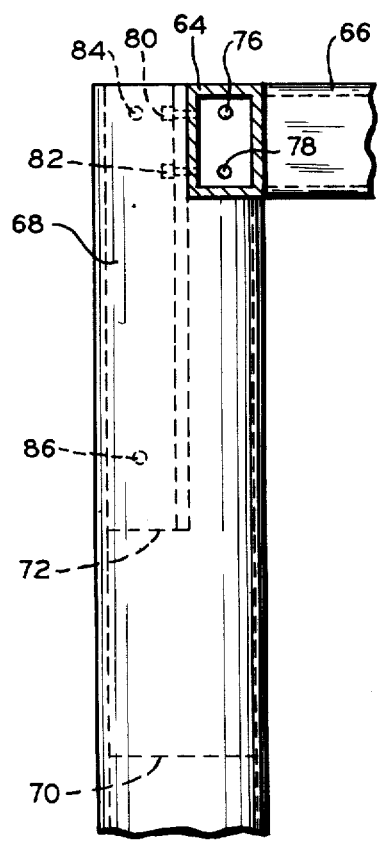
FIG. 8 is a fragmentary plan view of a corner structure according to the alternate embodiment of FIG. 7.

FIGS. 7 through 9 show an alternate embodiment of the present invention. FIG. 7 is a fragmentary perspective view, FIG. 8 is a fragmentary plan view and FIG. 9 is a fragmentary elevational view of a corner structure. A pair of side members 64 and 66 are terminated by mitered ends which abut. As shown, the side members form a right angle relationship. However, as was previously discussed, the angle may vary according to the number and lengths of the various side members which are connected to form the frame. The side members may be of tubular, rectangular cross-section construction.

A tubular upright leg 68 has a single, relatively wide slot extending longitudinally from the upper end thereof. The abutted ends of the side members 64 and 66 are inserted into the slot where they are retained by a planar wedge member 70 and an angular wedge member 72. The leg 68 may be terminated at the upper end by a top cap 74 similar to the top cap 28 of FIGS. 1, 2 and 5 and may be terminated at the lower end by a bottom cap (not shown) similar to the bottom cap 30 of FIGS. 1 and 2.

The side members 64 and 66 are attached to the wedge members 72 and 70 respectively to maintain the mitered end portions in abutting relationship. A pair of allen screws 76 and 78 are inserted through holes in the wedge member 70 and threadably engage the side member 66. Another pair of allen screws 80 and 82 are inserted through holes in the wedge member 72 and threadably engage the side member 64. The wedge members 64 and 66 are then connected together to place the mitered end portions of the side members 64 and 66 in abuting relationship. The wedge members 70 and 72 are connected to form a T-shaped wedging member, as viewed from above, by a pair of allen screws 84 and 86 which are inserted through holes in the wedge member 70 and threadably engage the wedge member 72.

The slot in the leg 68 has a length measured from the upper end of the leg equal to the height of the side members 64 and 66. Therefore, when the side members are inserted into the slot, the upper surfaces of the side members and the edge of the upper end of the leg are flush to form a supporting surface for the top cap 74.

The assembled wedge members and side members are lowered into the leg 68 until the lower surfaces of the side members rest on the bottom edge surface of the slot. The side members 64 and 66 are retained in the slot by the wedge members 70 and 72. The width of the wedge member 70 is slightly less than the diameter of the leg 68 such that the longitudinal edges of the ends of the top of the T-shaped wedging member come into contact with the inner surface of the leg. The width of the portion of the wedge member 72 adjacent the side member 64 is slightly less than the radius of the leg 68 such that the longitudinal edges of the bottom of the stem of the T-shaped wedging member come into contact with the inner surface of the leg. The wedge members 70 and 72 extend downwardly into the leg 68 such that the longitudinal edges of the T-shaped wedging member prevent movement of the side members 64 and 66 in the horizontal plane.

In summary, the alternate embodiment of the present invention provides a corner structure for a load supporting frame wherein the mitered end portions of horizontal side members are inserted into a longitudinally extending slot formed in the upper end of an upright tubular leg. A pair of wedge members are connected to the side members and engage the inner wall of the leg to form a rigid corner structure.

The present invention concerns a corner structure for a load supporting frame including an upright tubular leg having a slot means extending longitudinally from the upper end thereof; a pair of horizontal side members each having a mitered end portion, the end portions being attached in end abutting relationship at a predetermined angle and extending through the slot means; and a pair of wedge members cooperating to define the predetermined angle to securely hold the side members in the slot means. One of the wedge members is planar and has a first portion of its planar surface in contact with the mitered end portion of one side member with the longitudinal edges opposite the first portion engaging the inner wall of the tubular leg. The other one of the wedge members has a first portion in contact wth the mitered end portion of the other one of the side members with the lodngitudinal edges opposite the first portion engaging the inner wall of the tubular leg. In one embodiment, the slot means includes a pair of slots extending longitudinally from the upper end of the tubular leg substantially parallel to one another to form the predetermined angle wherein the mitered end portion of the side members each extend through one of the slots. The one wedge member has a lognitudinal slot defined therein and the other wedge member is planar with a tab formed along a longitudinal edge thereof for engaging the slot. The end portions are attached by a connector plate fastened thereto.

In an alternate embodiment, the slot means is a single slot extending longitudinally from the upper end of the tubular leg wherein the mitered end portions of the side members extend through the slot and are attached by being fastened to the wedge members. The other wedge member is an angle wedge member for defining the predetermined angle and the wedge members are fastened together.

In accordance with the provisions of the patent statutes, I have explained the principle and mode of operation of my invention and have illustrated and described what I now consider to represent its best embodiment. However, I desire to have it understood that the invention may be practiced otherwise than as specifically illustrated and described without departing from its spirit or scope.

What I claim is:

1. A corner structure for a load supporting frame, comprising:

an upright tubular leg having a single slot extending longitudinally from the upper end of said tubular leg;

a pair of horizontal side members each having a mitered end portion, said mitered end portions being attached in end abutting relationship at a predetermined angle, said mitered end portions of said side members extending through said slot; and a pair of wedge members cooperating to define said predetermined angle, one of said wedge members being planar and being attached to said mitered end portion of one of said side members and having a pair of longitudinal edges engaging the inner wall of said tubular leg and wherein the other wedge member is an angle wedge member for defining said predetermined angle and is attached to said mitered end portion of the other one of said side members with a pair of longitudinal edges engaging the inner wall of said tubular leg wherein said wedge members securely hold said side members in paid slot.

2. A corner structure as defined in claim 1 wherein said predetermined angle is a right angle.

3. A corner structure as defined in claim 1 wherein said tubular leg is a right circular cylinder.

4. A table frame for supporting a glass table top, comprising:

a plurality of upright tubular legs each having a single slot extending longitudinally from the upper end of each of said tubular legs;

a plurality of horizontal side members equal in numbers to said plurality of legs each having mitered end portions, a pair of said side members associated with each of said tubular legs, said mitered end portions of said side members extending through said slot and being attached together in end abutting relationship at a predetermined angle; and a plurality of wedge means equal in number to said pluralities of legs and side members, each of said wedge means including a pair of wedge members cooperating to define said predetermined angle, one of said wedge members being planar and being attached to said mitered end portion of an associated one of said side members and having a pair of longitudinal edges engaging the inner wall of an associated one of said tubular legs and wherein the other wedge member is an angle wedge member for defining said predetermined angle and is attached to said mitered end portion of the other associated one of said side members with a pair of longitudinal edges engaging the inner wall of said associated tubular leg wherein said wedge members securely hold said side members in said slot.

\* \* \* \* \*